Nov. 3, 1936.　　　R. BECK ET AL　　　2,059,722
APPARATUS FOR CONTROLLING PRESSURE FLUID
Filed Feb. 14, 1934　　　4 Sheets-Sheet 2

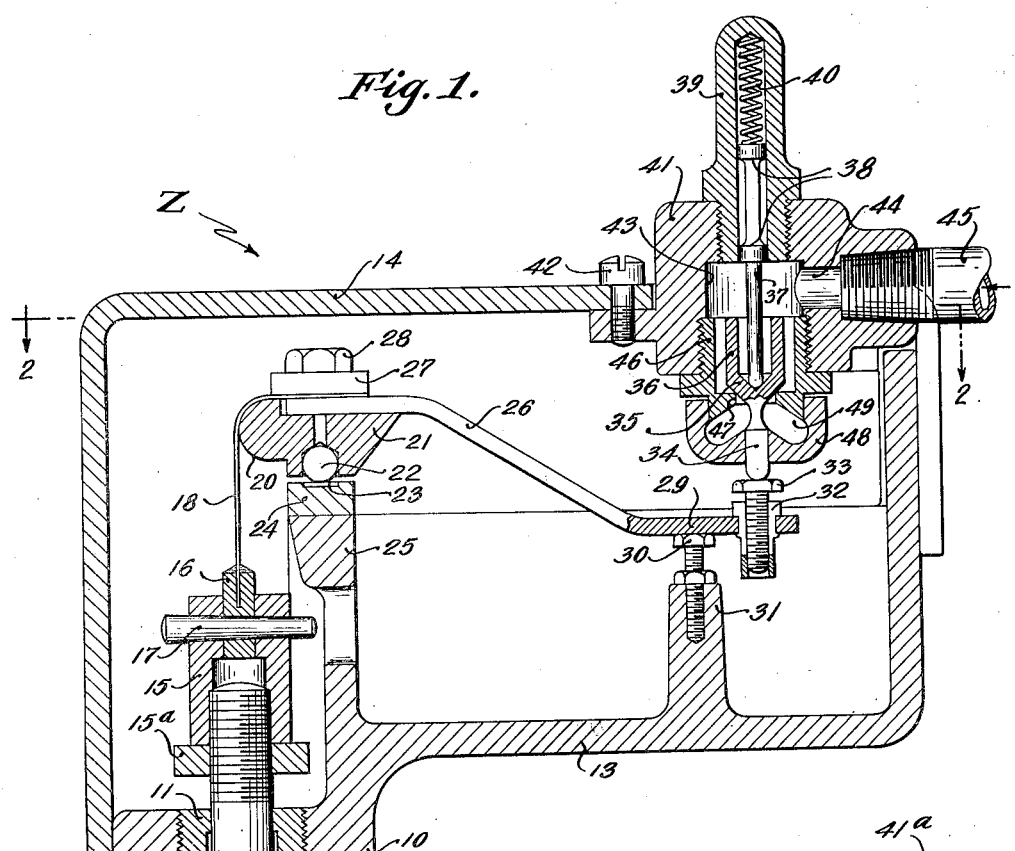
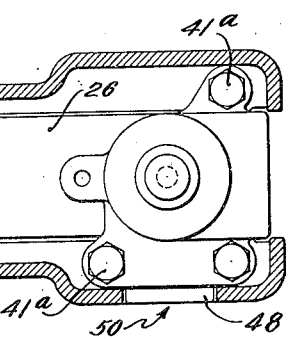
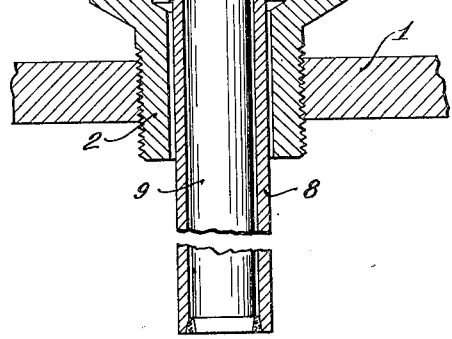

Inventors,
Rudolf Beck,
James Briscoe,
by Roberts Cushman & Woodberry
Attys.

Nov. 3, 1936.    R. BECK ET AL    2,059,722
APPARATUS FOR CONTROLLING PRESSURE FLUID
Filed Feb. 14, 1934    4 Sheets-Sheet 3

Inventors,
Rudolf Beck,
James Briscoe,
by Roberts Cushman & Woodberry
Attys.

Nov. 3, 1936.  R. BECK ET AL  2,059,722
APPARATUS FOR CONTROLLING PRESSURE FLUID
Filed Feb. 14, 1934  4 Sheets-Sheet 4

Inventors,
Rudolf Beck,
James Briscoe,
by Roberts Cushman Woodberry
Attys.

Patented Nov. 3, 1936

2,059,722

UNITED STATES PATENT OFFICE 2,059,722

APPARATUS FOR CONTROLLING PRESSURE FLUID

Rudolf Beck and James Briscoe, Bridgeport, Conn., assignors to Consolidated Ashcroft Hancock Company, New York, N. Y., a corporation of Delaware Application February 14, 1934, Serial No. 711,162

8 Claims. (Cl. 122—479)

This invention pertains to a method of and apparatus for regulating and controlling the pressure fluid in a system embodying fluid pressure generators or other containers, for example, boilers, superheaters, or oil stills, and in its more specific aspects is concerned with a novel arrangement and construction of valves, including a valve or valves designed automatically to open and close in response to a predetermined energy characteristic of the pressure fluid,—specifically to the temperature of the fluid. In the patent to Carl H. Graesser, No. 1,951,049, dated March 13, 1934, there is disclosed and broadly claimed a pressure system of the kind to which the present invention relates and on which the present invention is a specific improvement.

Under certain conditions of modern steam practice, as well as in other situations, very high temperatures and pressures are encountered. While most automatic relief or safety valves open and close in response to variations in pressure in the fluid, there are some situations in which abnormal temperature rise is more important than an excess pressure in determining the opening of the relief valve. Such a situation is found, for example, in the operation of steam superheaters, wherein the pressure fluid in the superheater does not follow the ordinary pressure-temperature relation for a saturated vapor, and wherein, unless proper precautions be taken, the temperature may rise to a point at which the metal walls of the superheater may soften and yield. It is manifest, that in dealing with steam at the high pressure now commonly generated, and particularly when the steam is superheated, it is very desirable to employ a safety or relief valve having a low blowdown, since excess blowdown under such conditions means the loss of great quantities of heat energy.

The difficulties encountered in attempting to provide a pressure responsive relief valve of large capacity and low blowdown, capable of working under present-day pressures and temperatures, are well known to those skilled in the art, and to avoid these difficulties, it is proposed, in accordance with the present invention, to employ thermally responsive means, rather than pressure responsive means, in controlling the pressure fluid in the system. With this object in view, the present invention provides improved valve means designed to respond to variations in temperature rather than variations in pressure of the working fluid; it provides an arrangement of controlling valves responsive, respectively, to generator and superheater temperatures and operative, in response to the attainment of predetermined, but different temperatures in the generator and superheater, respectively, to open a relief valve on the superheater; it provides for such control of the relief valve without recourse to electrical apparatus; and provides valve means of sensitive type but so devised as to be capable of withstanding exposure to high temperature and pressure without substantial injury.

With these and other objects which will be made manifest in the more detailed description, the invention comprises, among other things, thermal motor means comprising a motor element (for example, a bimetallic couple) which is sensitively responsive to temperature change and which, by responding to a predetermined temperature condition, opens or permits to close a valve which controls a fluid passage. This valve may for example be employed for controlling the operation of a main relief valve of the pressure loaded type having a back pressure chamber provided with a restricted inlet,—the thermally responsive control valve making it readily possible to obtain a very low blowdown of the main relief valve without sacrifice of capacity.

In the accompanying drawings, wherein we have illustrated one desirable embodiment of the invention by way of example, Fig. 1 is a vertical section illustrating one type of thermally responsive valve device useful directly upon the superheater, or other container in which very high temperatures are encountered;

Fig. 2 is a plan view of the device of Fig. 1, with the casing in section on line 2—2 of Fig. 1, and with certain parts broken away;

Figure 6:
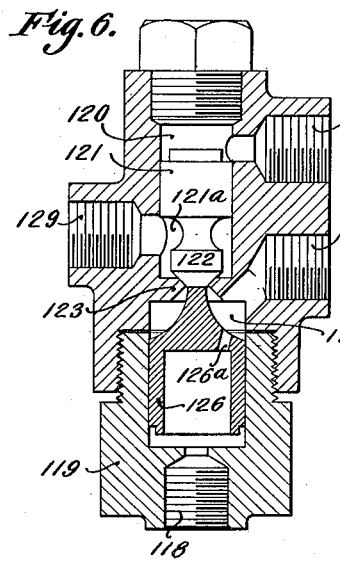
Fig. 6 is a vertical section through a relay-valve device useful in association with the valves of Figs. 1 and 4.

Referring to the drawings, the numeral 1 designates a portion of the shell of a boiler, superheater, oil-still or other receptacle or container for pressure fluid. This shell has an internally screw-threaded opening for the reception of the screw-threaded nipple 2 having the enlarged head portion 3. When employed in high pressure installations, the screw-threaded part 2 may obviously be replaced by a standard flange integral with the head portion 3. The head 3 of the nipple is hollow and is furnished with an internal conical seat surface 4 designed to make a fluid-tight joint with a similar conical surface at the lower end of a sleeve 5. This sleeve is provided with a shoulder at 6 for engagement by the inner end of a bushing 7 having screw-threaded engagement with the threaded inner wall of the nipple head 3. By means of this bushing 7 the sleeve 5 may be clamped down in steam-tight relation to the seat surface 4 of the member 3.

At its lower end the sleeve 5 is furnished with a recess which receives the upper end of a tube 8. The upper end of this tube is fixed within the recess, for example by welding, brazing, screw-threading, or in any other desired manner. This sleeve 8 extends downwardly through the nipple 2 and into the pressure-fluid space of the superheater or other receptacle, and at its lower end is fixedly united to a rod 9. This rod may be secured to the tube 8 at its lower end by means of welding, brazing, or other appropriate connecting means, and the rod extends up through the sleeve 5 and projects from the upper end of the latter, passing through an annular guide flange 11 at the upper end of the sleeve 5. The tube 8 and the rod 9 are made of materials, for example, bronze and steel, respectively, having quite different coefficients of expansion in response to temperature change. The tube 8 has a higher coefficient than the rod 9, so that when these parts are subjected to increasing temperature the different rates of expansion of the tube 8 and the rod 9 causes the rod 9 to move bodily downward, while decrease in temperature causes a reverse movement, the parts 8 and 9 thus constituting a thermal motor.

The upper end of the sleeve 5 has screw-threaded engagement with an opening in a downwardly directed boss 10, preferably forming an integral part of the lower wall 13 of the housing of a control valve Z. This housing may be made of any suitable material, for example cast-iron or bronze, and comprises the cover member 14 which is removable from the base portion.

The upper end of the rod 9 is screw-threaded and has screw-threaded engagement with a screw-threaded bore in a block 15, — a lock nut 15ᵃ being provided for retaining the parts in assembled relation. The block 15 is furnished with a slot at its upper end and this slot receives a plate 16 which is preferably held in assembled relation to the block 15 by means of a cotter pin 17 passing through aligned holes in the block 15 and in the plate 16. This plate 16 is also furnished with a slot in its upper edge for the reception of the end of a flexible motion-transmitting element 18. This element may, for example, consist of a piece of thin spring steel ribbon, — its lower end being permanently united to the plate 16 by brazing or the like, or by clamping screws or other suitable fastening connections. The flexible element 18 passes up and around an arcuate surface 20 at the left-hand end (as viewed in Fig. 1) of a rocker 21. This rocker may consist of a casting, or may be otherwise shaped in any appropriate way from suitable material, and has at its under side a pocket for the reception of a ball 22. This ball may be of hard steel, such for example as a bearing ball, and preferably rests upon a wear-resistant plate 23, for example of nitrided or other hard steel or the like disposed in a suitable slot or groove in a crossbar 24, which is secured to the upper edge of a web 25 forming a part of the bottom member of the housing. The transverse stiffness of the steel ribbon 18 prevents lateral tilting of the part 21 on the single point support provided by ball 22.

The rocker 21 supports one end of a lever 26 which is of resilient material, such as spring steel. The upper part of the flexible transmitting member 18, after passing over the arcuate surface 20, is turned down onto the upper surface of the upper end portion of lever 26, and the several parts are fixedly united to the rocker 21 by means of a clamping plate 27 and bolts 28.

The free extremity of the lever 26 is preferably disposed in a substantially horizontal plane, under normal conditions, as shown at 29, and is supported or limited in its downward movement by an adjustable stop member 30 having screw-threaded engagement with a boss 31 projecting up from the member 13. Near its free end, the lever 26 is furnished with an internally screw-threaded sleeve member 32 having a substantially vertical axis and which receives an adjustable contact member 33. This contact member is disposed immediately beneath and normally engages the lower end of a valve lifter member 34, which extends downwardly from the valve feather 35. This valve feather comprises a hollow body portion 36 which receives the lower end of a valve loading rod 37. This loading rod is preferably furnished with a pair of cylindrical enlargements 38 adapted to slide within a vertical bore in a guide cap 39, the upper end of which houses the valve loading spring 40, one end of which bears against the inner surface of the cap and the other end of which bears on the upper end of the loading rod 38. Since the lever arm to which the movement of the member 18 is applied is relatively short, such movement is multiplied as applied to the valve lifter 34.

The cap 39 is screw-threaded at its lower end and engages a threaded opening in the valve block 41, which is removably secured in place by means of bolts 41ᵃ. The cover member 14 is secured to the block by a screw 42. This block is furnished with a chamber 43 communicating by means of a passage 44 with a screw-threaded socket adapted to receive the screw-threaded end of a pipe 45, leading from a source of supply of pressure fluid as hereinafter more fully described.

The lower part of the block 41 is furnished with a screw-threaded bore axially aligned with the opening which receives the cap 39, and this bore receives the screw-threaded sleeve-like upper part 46 of a valve seat member which is furnished near its lower end with the annular seat surface 47 with which the valve feather 35 normally cooperates. When seated, the valve feather closes the passage through the valve seat which connects the chamber 43 with an exhaust passage 49. The passage 49 extends transversely through a member 48, preferably a casting, which may be secured within the housing by means of the aforementioned bolts 41ᵃ; the exhaust passage 49 leading out to one side of the housing and terminating for example at the point 50 (Fig. 2).

If this valve device, thus far described, be employed as the relief valve proper, the pipe 45 may then extend directly to the boiler or other container for the pressure fluid. However, for the purposes above mentioned, we prefer to employ the valve heretofore described merely as a control valve to determine the opening and closing of a relief valve of large capacity, and preferably of the pressure loaded type.

Figure 8:
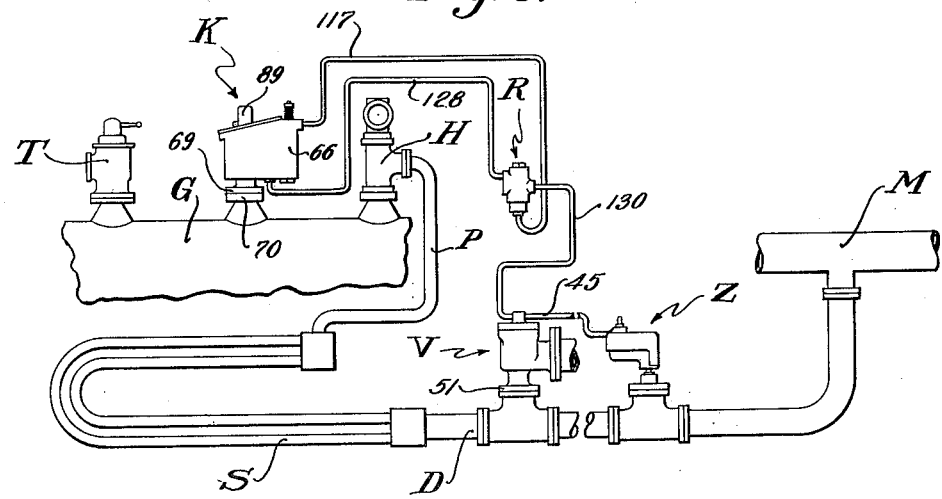
Fig. 8 is a diagrammatic view illustrating a boiler and superheater provided with a set of valves such as illustrated in Figs. 1, 4, 6 and 7.

In Fig. 8 we have illustrated one desirable arrangement wherein the valve device Z just described is mounted on a delivery pipe D leading from the outlet end of a superheater S to a main M. The superheater receives pressure fluid from a generator G, for example a steam boiler, through a pipe P leading from a header H connected to the boiler. As here shown, the delivery pipe is furnished with a relief valve V of large capacity and of the pressure loaded type.

Figure 7:
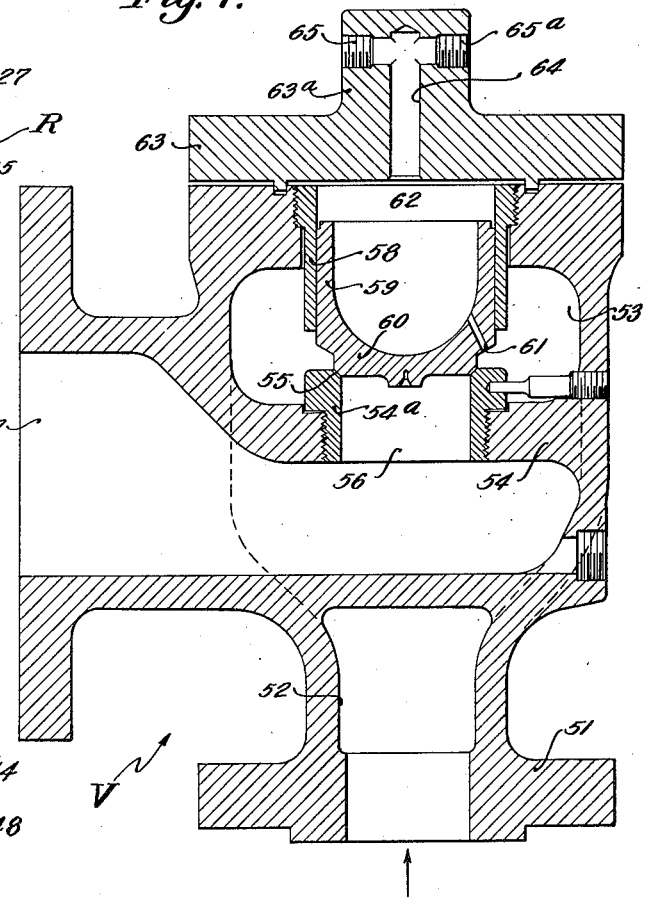
Fig. 7 is a vertical section illustrating one desirable type of pressure loaded relief or main safety valve designed for association with and to be controlled in its operation by the valve means of Fig. 1.
Figure 3:
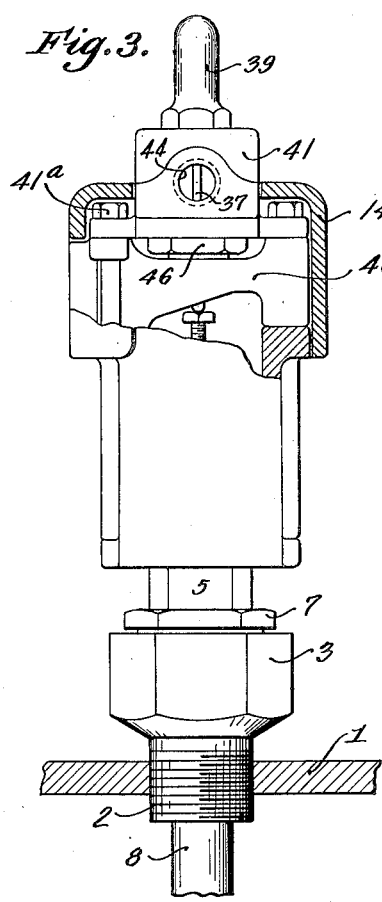
Fig. 3 is an end elevation, partly broken away and in vertical section, looking from the right-hand side of Fig. 1.

In Fig. 7 we have illustrated, by way of example, one desirable form of relief valve. This valve V comprises a casing having a flange 51 by means of which it may be attached to a suitable fitting on pipe D. A passage 52 concentric with flange 51 leads up into a chamber 53 within the body of the casing. A transverse web 54 extends through the chamber 53 and supports a sleeve provided with the annular valve seat 55 surrounding the passage 56, which in turn opens into the exhaust passage 57 formed in the part within the web 54, and which extends laterally out to one side of the casing, where it may open to the atmosphere or be continued through any suitable pipe or conduit to a desired point of discharge.

The upper part of the casing is furnished with an annular guide sleeve 58 of somewhat larger internal diameter than passage 56 and which may, if desired, be of some wear-resistant material and accurately machined to provide a proper sliding contact with the hollow skirt portion 59 of the valve feather 60. This skirt portion of the valve feather has a peripheral surface adapted to make steam-tight contact with the seat 55. The interior of the skirt portion of the valve feather, together with the upper part of the casing, forms a chamber 62 for pressure fluid above the valve 60, the space 62 constituting a back pressure chamber whose lower wall is movable. A restricted bleeder passage 61 leads through a wall of this chamber from the space 53. The valve casing is furnished with a cover 63 suitably secured by bolts (not shown), and this cover has a passage 64 communicating at one end with the back pressure chamber 62. The cover is also furnished with a boss 63ª having a pair of screw-threaded sockets 65 and 65ª communicating with the passage 64. The socket 65 receives the screw-threaded end of the pipe 45.

The valve parts are so designed and dimensioned that when pressure fluid, entering through the passage 52, fills the space 53, a portion of it enters through the bleeder opening 61 and fills the space 62 and exerts a somewhat greater pressure on the upper side of the valve feather than is exerted by the fluid in the space 53 against the lower side of the valve feather. The valve feather is thus normally held against its seat by the pressure fluid alone, so that no springs or other loading means are necessary. However, if the pressure in the chamber 62 be relieved, as by allowing pressure fluid to flow rapidly therefrom, then the effective pressure on the upper side of the valve becomes less than that on the lower side, and the valve opens very quickly to full capacity.

Figures 4, 5:
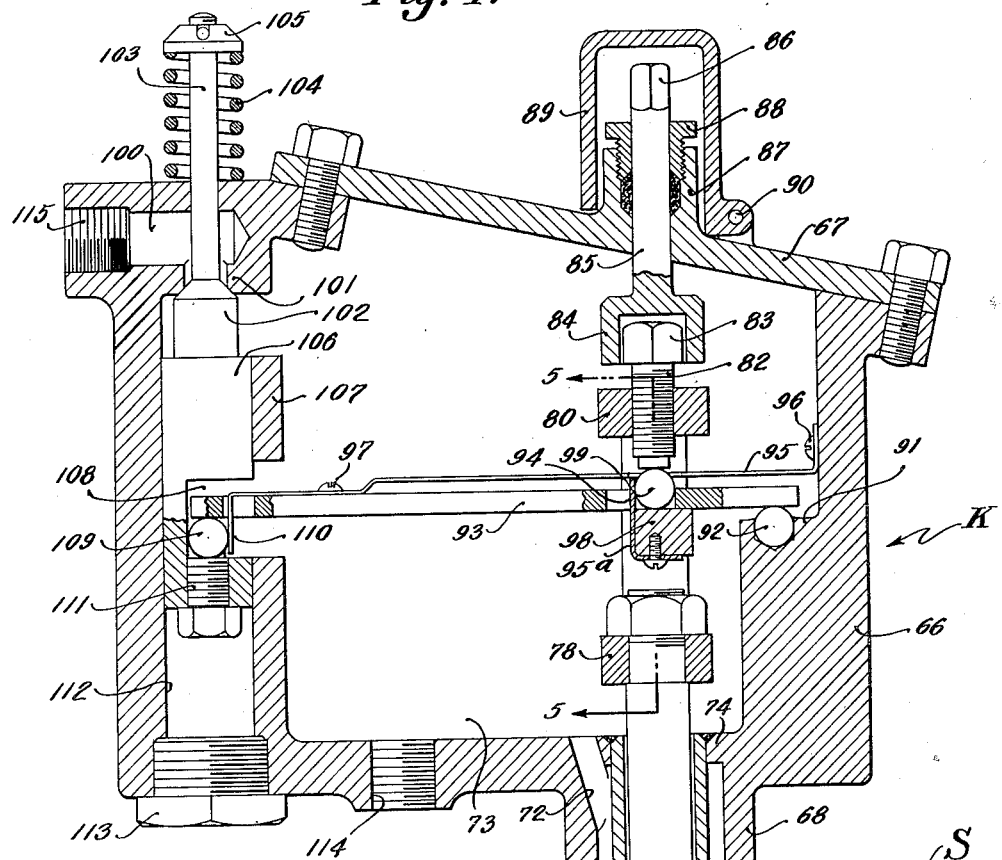
Fig. 4 is a vertical section illustrating a highly sensitive form of thermally responsive valve device useful, for example on a steam generator drum, where the temperatures are not as great as are encountered on a superheater.
Fig. 5 is a section on line 5—5 of Fig. 4.

The generator G may be provided with a safety valve or valves T of usual type and is here shown as also furnished with a control valve K which is illustrated in detail in Figs. 4 and 5.

This valve K comprises a casing having a body portion 66 and a removable cover 67. The bottom of the casing has a downwardly directed hollow boss or nipple 68 which may have a screw-threaded portion adapted to be screwed into a screw-threaded opening in a boiler shell S (Fig. 4) or which may comprise an integral flange member 69 (Fig. 8) adapted to be secured to a fitting 70 mounted on the shell of the generator G. The nipple 68 has an axial bore 71 opening into the pressure fluid space in the generator and is provided with a branch 72 at its upper end which leads into the chamber or space 73 within the body of the casing of the valve K. At the upper end of the bore 71 an annular flange 74 constitutes a support for the upper end of a tube 75 which passes freely down through the bore 71. The upper end of the tube is fixedly secured, as by brazing, screw-threading, or the like, to the flange 74. Within this tube is arranged a rod 76 which extends freely through the tube but which is securely united to the lower end of the tube 75 at the point 77 by means of brazing, screw-threading, or the like. The parts 75 and 76, as thus arranged, constitute a bimetallic thermostatic device, the tube 75 being of a material which expands more rapidly, when heated, than does the material of the rod 76. These parts may be made of the same materials mentioned as useful in the construction of the bimetallic thermostat 8, 9 of the device of Fig. 1.

The rod 76 projects up into the chamber 73 of the casing and has attached thereto a transverse substantially horizontal bar 78 (Fig. 5). At its opposite ends this bar carries a pair of spacer sleeves 79 which support a yoke member 80, the parts being united by bolts 81 passing through the sleeve 79 and having screw-threaded engagement with the bar 78. The yoke member 80 is furnished with a screw-threaded opening which receives a bolt 82 having a head 83. This head fits within a socket 84 similar to that of a socket wrench, the socket 84 having a stem 85 provided with a polygonal head 86 adapted to receive a wrench or other tool whereby the stem with its socket may be turned. The stem 85 passes up through a stuffing box in a hollow boss 87 projecting from the cover 67, such stuffing box including a gland 88 adapted to compress suitable packing material to prevent leakage of pressure fluid longitudinally of the stem. A cap 89, which may be secured in place by a wire seal passing through opening 90, normally houses the upper end of the stem 85.

The inner wall of the body 66 of the casing is furnished with a ledge at 91 having a recess which receives two bearing balls 92 spaced apart less than the width of the lever 93 which they support. These balls are not movable and form a fulcrum for one end of the lever 93. The latter is of resilient material and is arranged within the chamber 73 in normally substantial horizontal position. A leaf spring 95 is fixed at 96 to the wall of the casing and extends longitudinally above the lever 93, being spaced from the latter throughout the greater part of its length, and is secured to the lever at the point 97. The lever 93 has an aperture at 94. A block 98 is welded, brazed, or otherwise secured to the under side of lever 93 and supports a ball 99 disposed within the opening 94 and held in proper position by a vertical portion of a leaf spring 95ª secured to block 98. The lower end of the screw 82 is normally spaced slightly from this ball. By turning the screw 82 (by means of the socket-wrench device 84) the temperature at which the screw 82 will begin to exert pressure on ball 99 and lever 93 may be predetermined. Since the member 99 is but a short distance from the fulcrum 92, any motion of the thermostatic device is multiplied in being transmitted to the valve, now to be described.

At normal temperatures the lower end of screw 82 does not engage ball 99 and the resilient lever 93 is held loosely in contact with the balls 109 and 92 by the leaf spring 95 whose function is merely to keep the lever in proper operative position. Under normal conditions the balls 109 and 99 are positioned by the spring elements 110 and 95ª respectively so that the centers of the balls are on the vertical axes of the parts 106 and 82 respectively. When the temperature rises and screw 82 begins to press downwardly on the ball 99, the lever 93 is flexed downwardly in an arc,—the balls 92 forming a fixed fulcrum adjacent to one end of the lever. If it were not for the balls 109 and 99, interposed between the lever 93 and the parts 111 and 82, respectively, and which reduce the friction between the engaging parts to a minimum, such flexing of the lever (which results in a slight lateral shifting of the contact points of the balls) would result in substantial friction, thereby lessening the delicacy of operation. In particular, such friction would tend to develop side pressure of the member 106 against its guides such as would prevent valve 102 from seating accurately, with consequent leakage of steam and rapid wear of the valve seat.

The upper part of the casing 66 is furnished with a chamber 100 from which a passage, defined by an annular valve seat 101, leads into chamber 73. A valve feather 102 normally engages the seat 101 and is furnished with a stem 103 which projects up through the top of the casing. This stem is surrounded by a light coiled spring 104 which may be adjustably tensioned by means of a nut 105 engaging the upper end of the stem 103. This spring, assisted by the fluid pressure in chamber 73, normally holds the valve feather in contact with its seat.

The valve feather 102 is furnished with a cylindrical head 106 which slides in a bore in a rib 107 on the wall of the casing. This head 106 is furnished with a vertically elongated slot 108 which receives the free end of the lever 93. This free end of the lever normally rests on a ball bearing 109 which is conveniently retained in position by a downturned end portion 110 of the spring 95, and which rests upon the upper end of an adjusting screw 111 in a threaded bore in the lower end of head 106. The head of screw 111 is disposed within a chamber 112 to which access may be had by means of a removable plug 113.

The casing has a screw-threaded opening 114 in its bottom wall, and also has a screw-threaded socket 115 leading from the chamber 100. A pipe 117 leads from the latter socket to a screw-threaded socket 118 in the lower part 119 of a casing of a relay valve R (Figs. 6 and 8). This relay valve, or its equivalent, is provided for use with the valve device of Fig. 4, since it protects the temperature sensitive elements of the latter from contact with fluid at superheater temperature, and also permits the use of the inwardly opening valve 102 and avoidance of parts passing through stuffing boxes or equivalent friction producing elements.

This relay valve casing is furnished with a chamber 120 at its upper part within which slides the cylindrical head portion 121 of a relay or exhaust valve feather 122 disposed within a chamber 121ª near the central part of the casing. This exhaust valve feather cooperates with an annular valve seat 123 defining a passage connecting the chamber 121ª and a discharge passage 124 in the lower part of the casing. Within this latter chamber slides a hollow cylindrical piston member 126. The interior of this piston, together with the lower part of casing 119, forms a chamber for pressure fluid, and a restricted bleeder passage 126ª leads through the movable upper wall of the chamber into the discharge passage 124. The passage 124 is furnished with a lateral outlet 125 which may be screw-threaded if desired for the reception of an exhaust pipe, not shown, leading to any suitable point. The casing is also furnished with a screw-threaded socket 127 communicating with chamber 120 and which receives a pipe 128 leading to the opening 114 in the bottom of the casing of valve K, or to any other convenient source of saturated steam or vapor (not superheated) approximately at boiler pressure. The exhaust valve casing also has a threaded socket 129 communicating with the chamber 121ª, and from this socket a pipe 130 leads to the socket 65ª of the main relief valve V.

By employing the control valve K in combination with the control valve Z shown in Fig. 1, and in the combination illustrated in Fig. 8, it is possible to cause the relief valve V to blow in response to excess temperature, either in the discharge pipe D from the superheater or in the generator G itself. Assuming that the bi-metallic thermostat of the valve K has been designed to respond to a predetermined abnormal temperature in the generator G, and assuming that all of the other valves are closed, it may be noted that steam from the generator normally fills the chamber 73 and forces valve feather 102 against its seat 101, and keeps all of the valve parts at a substantially uniform temperature and pressure during normal operation of the generator. However, if the generator temperature rises abnormally, the thermostatic element 75 expands and pulls down on rod 76. This in turn draws the yoke 80 downwardly and imposes tension on the resilient lever 93. This tension gradually increases, thus storing energy in the lever until eventually the force exerted by the free end of the lever 93 is sufficient to slightly overbalance the steam pressure on valve 102 plus the pull of spring 104. As soon as the valve is slightly off its seat pressure will build up in chamber 100, as the steam cannot escape fast enough through vent 126ª of the relay or exhaust valve. This building up of pressure in cooperation with the tension of resilient lever 93 will cause a snap action opening of valve 102.

Fluid at generator pressure is now permitted to flow into chamber 100 and through the pipe 117 into the space below the piston 126 of the exhaust valve R. This valve has previously been held to its seat by fluid at substantially generator pressure in the chamber 120 delivered through the pipe 128. However, when the piston 126 is exposed to generator pressure by the opening of valve 102, the valve 122 is raised, it being noted that the piston 126 is of greater diameter than the piston 121. Pressure fluid is thus permitted to flow from the back pressure chamber 62 through the pipe 130 into the chamber 121ª of the relay or exhaust valve, thence through the valve seat 123 and into the exhaust passage 125. The main valve 60 is now unseated by reason of the unbalanced pressure beneath it, and the valve opens wide to permit escape of pressure fluid very rapidly from the generator.

Obviously, from the construction described, the relief valve V will blow whenever the temperature, either in the generator itself or in the superheater delivery pipe D, exceeds a predetermined temperature. The control valves herein described are of highly sensitive character such that they may readily be set to respond to a temperature variation within a range of 25° F. and it will be noted that whichever of the control valves operates first, the relief valve V, in responding, will draw steam from the superheater so that there is no possibility that the latter will become overheated by failure of a proper flow of fluid therethrough. By the use of the exhaust valve R in association with control valve K, it is possible to obtain greater sensitiveness of operation at the relatively low temperatures to which the valve K is exposed, since the thermostatic device is only required to open the delicately loaded valve device 102, whereupon fluid at generator pressure unbalances the relay or exhaust valve and releases the pressure in the back pressure chamber of the relay valve V. Since the temperature range to which control valve Z is exposed is large, the substantial movement of the parts of the thermostatic device may be depended on to produce the desired movement of the valve device 36, even though the latter be exposed to substantial pressure.

Operation

Assuming that the valve 60 is closed, and that the valves 35, 102 and 122 are also closed,—if the pressure fluid within the superheater rises above a predetermined point, the tube 8 expands, thus drawing the rod 9 downwardly and pulling on the flexible element 18. The pull on this element tends to tip the rocker member 21 about the fulcrum provided by the roller 22, but such movement is opposed by the action of the spring 40 and by the pressure fluid in chamber 43, which normally tend to hold the valve 35 against its seat and with the member 34 engaging the member 33. However, after the member 8 has expanded in response to the attainment of a predetermined temperature, the resilient lever 26 will have been stressed thereby, and will have stored up energy. Eventually, the force exerted by the lever will become great enough to unseat the valve slightly. As soon as pressure fluid begins to escape between the valve and its seat, the fluid pressure above the valve is reduced, and the stored-up energy of the spring will suddenly open the valve to its full extent so as to permit pressure fluid from the chamber 62 to pass through the pipe 45, thence through the valve seat 47 and out through the passage 49. This at once enables the unbalanced fluid pressure to open the main valve 60 so that pressure fluid is exhausted very rapidly from the superheater delivery pipe D, thus maintaining a rapid flow of fluid through the superheater which will reduce the temperature in the superheater and if the discharge capacity of the valve is selected properly in relation to the heating capacity of the superheater burner, the superheater will be maintained at a safe temperature. When the temperature has been lowered, the tube 8 contracts, allowing the member 18 to rise and thus permits the spring 40 to restore the valve 35 to its seat. Pressure immediately builds up in the chamber 62, and thus closes the valve 60 so that further loss of pressure fluid is prevented.

Obviously, by choosing the members 8 and 9 of proper relative coefficients of expansion and of proper relative length, the valve may be made to open at substantially any desired temperature. It will be noted that only the part 8 is exposed to the maximum pressure and temperature conditions within the superheater, and that by the time the pressure fluid has passed through the chamber 53 and through the chamber 62 and thence to the chamber 43 of the control valve, its temperature will have dropped to such an extent that injury to the parts of the control valve by excess temperature need not be feared.

By the use of the motion transmitting member 18 all movable joints between the thermally responsive element and the lever 26 are eliminated, so that there is no lost motion between these parts, and thus the operation of the control valve is very accurate and dependable. Since, as above noted, the parts of the control valve, with the exception of the part 8, are not exposed to the pressure fluid at high temperature, they do not rapidly deteriorate and are capable of performing their intended function over a long period of time without repairs. The proper working of the lever arrangements in both valve designs Fig. 1 and Fig. 4 depends on proper dimensioning of the resilient levers. A numerical example will indicate the method by which suitable dimensions may be determined. Suppose valve 35 has an effective seating area of .10 square inch and is used for 500 lbs. per square inch pressure and requires a $\frac{1}{16}$ inch lift for operating valve 60. Further, spring 40 may exert a pressure of 10 lbs. The steam pressure on .10 square inch is 50 lbs. making a total of 60 lbs. Resilient lever 26 should then be designed so that with a load of 60 lbs. at point 33 it will deflect at least $\frac{1}{16}$ inch.

It will be noted also, that figuring on 60 lbs. at the outside end of the lever 26, and a lever ratio of 1:5,—the pull at 18 has to be about 300 lbs. and the load on ball 22 is 360 lbs. This will indicate to anyone versed in the art the reason for avoiding plain or pivot bearings and using rolling bearings throughout. Knife-edge bearings, of course, might be used, but the ball-roller transmission as indicated has the advantage of lower cost and less wear.

The valve device illustrated in Fig. 1 is primarily designed for superheater protection or other uses where high accuracy is not necessary. When such an arrangement as that of Fig. 1 is exposed to substantial variations in temperature, for example, to drafts of air, some errors in operation may result from unequal expansion or contraction of the operating parts, and this error may amount to as much as 10 to 15° F. in the temperature at which the valve will open or close. However, such relatively slight errors are of little consequence when the valve is used for superheater protection or in similar places where a temperature variation of 10 to 15° is so small a percentage of the total temperature.

Figure 9:
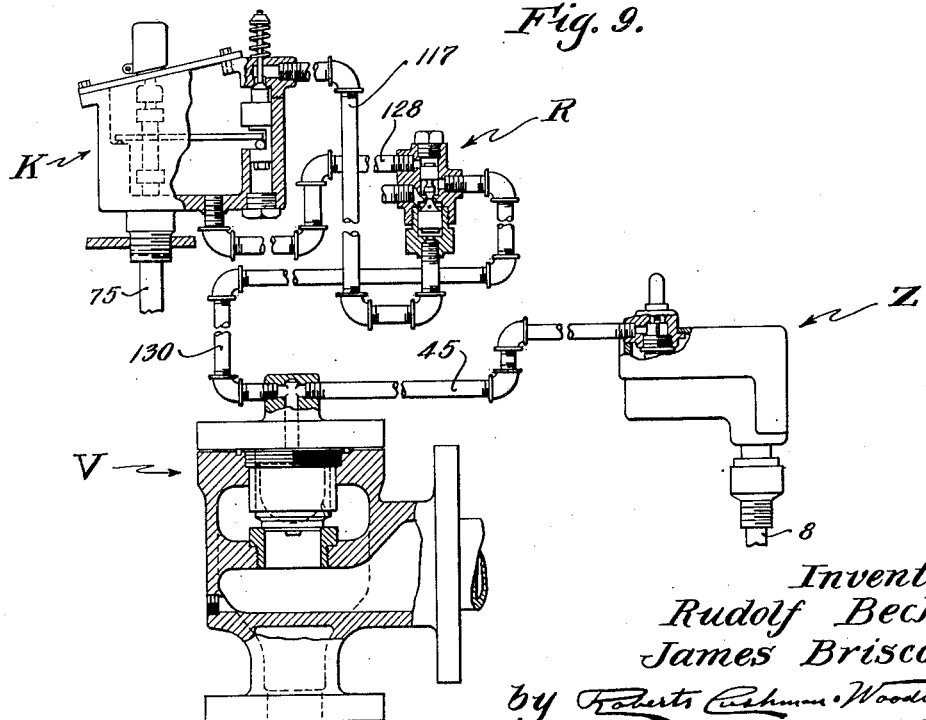
Fig. 9 is a diagrammatic view to larger scale.

While the device of Fig. 1 is useful for the purpose and under the conditions above described and may be preferable in such situations in view of its simplicity, cheapness, and the ready accessibility of the operating parts,—the valve device of Fig. 4 is more useful under other conditions (for example where great accuracy in operation is required) and if desired may be substituted for the device of Fig. 1 in such a system as that illustrated in Figs. 8 and 9. The device of Fig. 4 is intended to control pressure in response to the equivalent vapor temperature and is accurate to within 2 or 3° F. It thus may be used, for example, to control the blowing of a boiler working at 500 lbs. pressure and with a blowdown of only 10 lbs. since such a blowdown corresponds to a change in vapor temperature of only 2° F. In the arrangement shown in Fig. 4 all of the operating parts are kept at substantially the same temperature by immersion in saturated vapor substantially at a boiler pressure so that changes in outside temperature do not appreciably affect the operation of the device. In this device the casing or housing 66 must be steam tight and heavy enough to sustain the boiler pressure. If the device of Fig. 4 is to be substituted for that of Fig. 1 in the system shown in Figs. 8 and 9, the passage 72 is closed and the pipe 45 is connected to the casing at 115, and the opening at 114 would constitute the discharge.

While we have illustrated a desirable embodiment of the invention by way of example, we wish it to be understood that various changes in size, proportion and arrangement of parts, as well as the substitution of other materials than those specifically mentioned, may be made without departing from the spirit of the invention. Other useful arrangements may suggest themselves to those skilled in the art, but we contemplate that all such arrangements as fall within the scope of the appended claims are to be regarded as forming a part of this invention.

We claim:

1. The combination with a generator and a superheater to which the generator supplies pressure fluid, of a relief valve adjacent to the delivery end of the superheater, said relief valve being of the pressure loaded type and having a back pressure chamber to which pressure fluid is normally admitted through a restricted passage, a control valve on the superheater comprising a valve feather normally closing an exhaust passage leading from said back pressure chamber, a bimetallic thermostatic device exposed to the temperature of the pressure fluid in the superheater, means responsive to said thermostatic device for opening the control valve, a relay valve casing which houses a relay-valve feather that normally closes an exhaust duct leading from said back pressure chamber, a control valve on the generator, said latter control valve comprising a control-valve feather normally closing a passage arranged to conduct pressure fluid from the generator to the relay valve casing, a bimetallic thermostatic device exposed to the temperature of the pressure fluid in the generator, and means responsive to said latter thermostatic device for opening said second-named control valve, thereby to permit pressure fluid to flow from the generator to the relay valve casing, and means responsive to the pressure of such fluid to open the relay valve.

2. The combination with a pair of pressure fluid containers G, S in which pressure fluid is maintained at substantially different temperatures, respectively, a relief valve V for the container S in which the higher temperature is maintained, said relief valve V having a back pressure chamber provided with a movable wall and a restricted passage which admits pressure fluid from the high temperature container S to said back pressure chamber, thermally actuated valve devices K and Z on the respective containers G and S, fluid conducting piping 45 extending from said back pressure chamber of the valve V to the thermally actuated valve device Z, said device Z being constructed and arranged to vent pipe 45 at a predetermined temperature, a protective device R including a casing, piping 130 leading from the back pressure chamber of the relief valve V to said casing, piping 117 arranged to conduct actuating fluid from the thermally actuated valve device K to said casing, said casing having venting means therein actuable by fluid supplied through piping 117 for venting pipe 130 when the fluid in container G attains a predetermined temperature, the venting means being constructed and arranged to prevent flow of pressure fluid from the high temperature container S through piping 130 and 117 to the valve device K, substantially as set forth.

3. The combination with a relief valve V for pressure fluid, said valve V having a back pressure chamber provided with a movable wall and a restricted passage which admits pressure fluid to said back pressure chamber, of a pair of thermostatically actuated controllers K and Z respectively, one of said controllers being sensitively responsive to temperature changes of the order of 2° F. and the other being sensitively responsive to temperature changes of the order of 10° F., said controllers K and Z being normally exposed to pressure fluid at relatively low and high temperature ranges respectively, piping 45 extending from the controller Z to the back pressure chamber of the relief valve V, a protective device R including a casing, a pipe 130 leading from said casing to the back pressure chamber of relief valve V, piping 117 leading from the controller K to said casing, the controller Z being constructed and arranged to vent pipe 45 at a predetermined temperature at controller Z and the piping 117 being arranged to supply pressure fluid to the casing of device R upon attainment of a predetermined temperature at controller K, the casing of the protective device R having therein venting means, responsive to pressure fluid supplied by piping 117, to vent pipe 130, said venting means including a septum operative to prevent high temperature fluid from the back pressure chamber of valve V from flowing through the piping 117 to the controller K, substantially as set forth.

4. In combination with a pair of containers G and S for pressure fluid in the first of which the fluid temperature range is small and relatively low while in the second the fluid temperature range is large and relatively high, a relief valve V for the last-named container, a delivery pipe leading from each container, the relief valve V having a pressure responsive actuating motor including a chamber for pressure fluid, a pair of conduits 45 and 130, respectively, leading from said chamber, thermally actuated controllers K and Z associated with the respective containers and responsive, respectively, to predetermined temperatures in said containers, each of said controllers including a heat sensitive element which does not constitute any part of the delivery pipe of its respective container, the controller Z being arranged to vent the pipe 45 at a predetermined temperature in container S; piping 117 leading from the other controller K, the latter controller being arranged to admit pressure fluid to piping 117 upon attainment of a predetermined temperature in container G, and a protective device R including a casing to which lead the piping 117 and the conduit 130, said protective device comprising parts constructed and arranged to vent pipe 130 in response to pressure fluid supplied by pipe 117 and to prevent pressure fluid from the pressure chamber of the relief valve from flowing through the conduit 130 and the duct 117 to the controller K, substantially as set forth.

5. In combination with a pair of containers for pressure fluid in one of which the fluid temperature range is small and relatively low, while in the other the fluid temperature range is relatively high, a relief valve for the last-named container, a delivery pipe leading from each container, the relief valve having a pressure responsive actuating motor including a chamber for pressure fluid, a pair of conduits 45 and 130, respectively, leading from said chamber, a thermally actuated controller Z comprising a heat sensitive element which does not constitute any part of the delivery pipe of the high temperature container but which is exposed to and responds to variations in temperature in the high temperature container, said device Z being operative to control the escape of pressure fluid from the pressure chamber of the relief valve through the conduit 45, a pressure responsive exhaust valve R operative to control the escape of pressure fluid from the pressure chamber of the relief valve through the conduit 130, and a thermally actuated controller device K comprising a heat sensitive element which does not constitute any part of the delivery pipe leading from the low pressure container but which is exposed to and responds to variations in temperature in the low pressure container, said controller device K being operative to admit pressure fluid to the exhaust valve for actuating the latter, substantially as set forth.

6. The combination with a pair of containers for pressure fluid in one of which the fluid temperature is relatively low as compared with that in the other container, a relief valve for the high temperature container, the relief valve being of the type having a back pressure chamber provided with a movable wall and a restricted fluid passage which admits fluid from the high temperature container to enter said chamber, and means operative to exhaust the pressure fluid from said chamber, said exhaust means comprising a pair of exhaust valves 122 and 35 respectively, a bimetallic thermal motor 8, 9 responsive to temperature in the high temperature container and operating directly to open one (35) of said exhaust valves, and means including a pressure motor 121, 126 and a bimetallic thermal motor 75, 76 for opening the other exhaust valve 122, said latter thermal motor 121, 126 being responsive to temperature in the low temperature container, substantially as set forth.

7. Pressure relief apparatus for a pressure fluid system, said relief apparatus comprising in combination a relief valve V including a housing having therein a main valve seat, a main valve feather, and a back pressure chamber to which only a restricted flow of pressure fluid is admitted and in which sufficient pressure is normally maintained to hold the valve feather to its seat, an exhaust valve R including a casing which houses an exhaust valve feather normally closing an exhaust passage leading from said back pressure chamber of the relief valve V, a pressure responsive element normally holding said exhaust valve seated, means arranged to conduct pressure fluid from a part of the system to act on said pressure responsive element, a thermally actuated controller K including a valve which opens in response to a predetermined temperature at a selected point in the system and thereby allows pressure fluid to enter said exhaust valve casing, and pressure motor means which responds to pressure fluid permitted by the operation of controller K to enter the exhaust valve casing and thereby unseats the exhaust valve feather so as to exhaust said back pressure chamber of the relief valve V.

8. Pressure relief apparatus for a pressure fluid system, said relief apparatus comprising in combination a housing having therein a main valve seat, a main valve feather and a back pressure chamber to which fluid is admitted only at a restricted rate and in which sufficient pressure is normally maintained to hold the main valve feather to its seat, a valve casing which houses an exhaust valve feather normally closing an exhaust passage leading from said back pressure chamber, a pressure responsive element normally holding said exhaust valve feather seated, a control valve comprising a chamber containing pressure fluid, a control valve feather normally closing a duct leading from said chamber of the control valve to the casing of the exhaust valve, a resilient lever for unseating said control valve feather, actuating means, including a temperature responsive thermostatic device, for moving said lever thereby to unseat the control valve feather and allow pressure fluid to flow from the chamber of the control valve casing to the exhaust valve casing, and means within the latter responsive to the pressure of such fluid to unseat the exhaust valve feather.

RUDOLF BECK.
JAMES BRISCOE.